Patented May 30, 1933

1,912,318

UNITED STATES PATENT OFFICE

KARL STREITWOLF, OF FRANKFORT-ON-THE-MAIN, ALFRED FEHRLE, OF BAD SODEN-ON-THE-TAUNUS, AND HUBERT OESTERLIN, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

2-HYDROXYMETHYLBENZIMIDAZOLARSONIC ACID

No Drawing. Application filed April 14, 1931, Serial No. 530,132, and in Germany April 29, 1930.

The present invention relates to 2-hydroxymethylbenzimidazol-arsonic acids.

We have found that 2-hydroxymethylbenzimidazol-arsonic acids of the following general formula

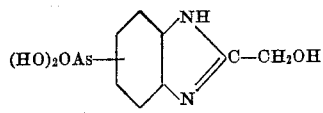

are obtained by treating ortho-diaminobenzenearsonic acids with glycolic acid. The reaction may, for instance, be carried out by melting together an ortho-diaminobenzene-arsonic acid and glycolic acid, or by heating the arsonic acid with an aqueous, preferably concentrated, solution of glycolic acid. In the latter case it has proved to be advantageous to carry out the reaction in the presence of a mineral acid, as for instance, concentrated hydrochloric acid.

The new 2-hydroxymethyl-benzimidazol-arsonic acids are of therapeutical value and can be utilized, for instance, for the treatment of nagana and its recurrence.

The products form salts with alkalies and with organic bases: the aqueous solutions of these salts are stable, especially when a small amount of sodium sulfite is added thereto.

The following examples serve to illustrate the invention, but they are not intended to limit it thereto.

(1.) 46.4 grams of 3.4-diaminobenzene-1-arsonic acid are intimately mixed with 38 grams of crystallized glycolic acid or the corresponding quantity of concentrated aqueous solution of glycolic acid and heated in the oil bath to 110° C.; at that temperature the reaction occurs and the mass gradually solidifies while foaming. The whole is taken up with about 300 cc. of hot water and cleared with animal charcoal; on cooling, the 2-hydroxymethyl-benzimidazolarsonic acid separates; it is recrystallized from dilute sodium acetate solution or from an aqueous solution. The reaction probably occurs according to the following equation:

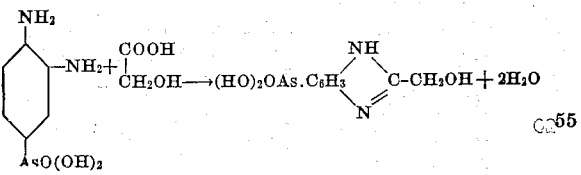

and the product thus obtained has the following probable constitution:

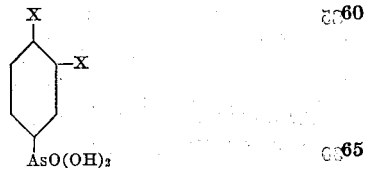

wherein both of the X's stand for the group

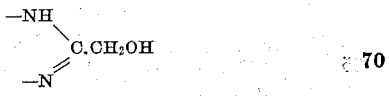

The yield amounts to 30 grams. The product melts, but not sharply, at 210° C.–215° C. with decomposition. It is difficultly soluble in cold water, soluble in methyl alcohol and ethyl alcohol, insoluble in acetone and ether.

(2.) 40 grams of 3.4-diaminobenzene-1-arsonic acid are dissolved in 300 cc. of hydrochloric acid (specific gravity=1.08), 30 grams of a 70% glycolic acid solution are added thereto and the whole is boiled for 1 hour in a reflux apparatus. The dark solution is filtered with animal charcoal and neutralized with caustic soda solution until there is a neutral reaction to Congo paper. The separated 2-hydroxymethylbenzimidazol-arsonic acid is filtered by suction and recrystallized from dilute sodium acetate solution. The yield amounts to about 25 grams. The properties are the same as those indicated in Example 1.

(3.) 23 grams of 2.3-diaminobenzene-1-arsonic acid are intimately mixed with 20 grams of glycolic acid and heated to 115° C.–120° C. The mass becomes viscid and then solid. It is taken up with 150 cc. of hot water and cleared with decolorizing charcoal. From the filtrate the 2-hydroxymethylbenzimidazol-arsonic acid of the following probable constitution

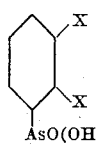

wherein both the X's stand for the group $$-NH \diagdown C.CH_2OH \diagup -N$$

crystallizes which is recrystallized from dilute sodium acetate solution. The yield amounts to about 20 grams. It is very difficultly soluble in water, soluble in methyl alcohol and ethyl alcohol and melts, but not sharpy, at 250° C. with decomposition. The same product can also be obtained by the precedure described in Example 2.

We claim:

1. The compounds of the following probable formula

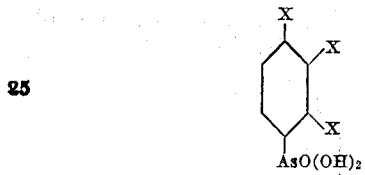

wherein two X's in ortho-position stand for the group

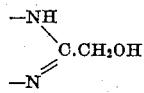

the other X stands for hydrogen.

2. The compound of the following probable formula

wherein both of the X's stand for the group

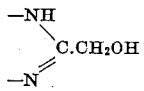

melting, but not sharply, at 210° C.–215° C. with decomposition, being difficultly soluble in cold water, soluble in methyl alcohol and ethyl alcohol and insoluble in acetone and ether.

3. The compound of the following probable formula

wherein both the X's stand for the group

melting, but not sharply, at 250° C. with decomposition, being very difficultly soluble in water, soluble in methyl alcohol and ethyl alcohol.

In testimony whereof, we affix our signatures.

KARL STREITWOLF.
ALFRED FEHRLE.
HUBERT OESTERLIN.